United States Patent
Hara et al.

(10) Patent No.: US 7,849,957 B2
(45) Date of Patent: Dec. 14, 2010

(54) CONTROL APPARATUS FOR ELECTRIC POWER STEERING

(75) Inventors: Takeshi Hara, Maebashi (JP); Yong Wei, Maebashi (JP); Hideaki Okazaki, Maebashi (JP); Sakae Nejo, Maebashi (JP)

(73) Assignee: NSK Ltd., Tokyo (JP)

( * ) Notice: Subject to any disclaimer, the term of this patent is extended or adjusted under 35 U.S.C. 154(b) by 593 days.

(21) Appl. No.: 11/778,194

(22) Filed: Jul. 16, 2007

(65) Prior Publication Data

US 2008/0078608 A1    Apr. 3, 2008

(30) Foreign Application Priority Data

Jul. 14, 2006  (JP)  ............................. 2006-194619
Jul. 25, 2006  (JP)  ............................. 2006-201487

(51) Int. Cl.
   *B62D 5/04*   (2006.01)
(52) U.S. Cl. ..................................................... 180/446
(58) Field of Classification Search ................ 180/402, 180/405, 446
   See application file for complete search history.

(56) References Cited

U.S. PATENT DOCUMENTS

| 6,799,656 | B2 * | 10/2004 | Kimura et al. | 180/446 |
| 2003/0168276 | A1 | 9/2003 | Kimura et al. | |
| 2004/0188172 | A1 | 9/2004 | Asada | |
| 2005/0189897 | A1 | 9/2005 | Satake et al. | |
| 2005/0236223 | A1 | 10/2005 | Yokota | |

FOREIGN PATENT DOCUMENTS

| EP | 2002-104211 A | 4/2002 |
| EP | 1752359 A1 | 2/2007 |
| JP | 45-41246 A | 12/1970 |
| JP | 8-54229 A | 2/1996 |
| JP | 2568817 A | 10/1996 |
| JP | 10-274520 A | 10/1998 |
| JP | 2000-95132 A | 4/2000 |
| JP | 200314450 A | 1/2003 |
| JP | 2003137126 A | 5/2003 |
| JP | 2003-252228 A | 9/2003 |
| JP | 200464921 A | 2/2004 |
| JP | 2005254983 A | 9/2005 |
| JP | 2003-291842 A | 9/2007 |
| WO | 2005/105550 A1 | 11/2005 |

OTHER PUBLICATIONS

European Office Action dated Oct. 17, 2008.

* cited by examiner

*Primary Examiner*—Tony H. Winner
(74) *Attorney, Agent, or Firm*—Sughrue Mion, PLLC

(57) ABSTRACT

An electric power steering apparatus including a steering angle detection part that detects a steering angle of a steering wheel and outputs a steering angle signal, a steering control unit that controls a motor to give an assist torque to the steering wheel, an abnormality detection part that determines an abnormality of the steering angle detection part, and a motor angle detection part that detects a rotational angle of the motor. The steering control unit calculates a steering angle information based on at least the steering angle signal, and includes a signal storage part that stores the steering angle information. The steering control unit runs the motor continuously when the abnormality detection part detects the abnormality of the steering angle detection part until a vehicle stops or until the abnormality detection part determines that the steering angle signal returns to a normal state from the occurrence of the abnormality.

3 Claims, 13 Drawing Sheets

RELATED ART

CONTROL APPARATUS FOR ELECTRIC POWER STEERING

The present application, is based on Japanese Patent Application No. 2006-194619 filed on Jul. 14, 2006 and No. 2006-201487 filed on Jul. 25, 2006, and the contents thereof are incorporated herein by reference.

BACKGROUND OF THE INVENTION

1. Technical Field

The present invention relates to a control device of an electric power steering apparatus that gives the assist torque by a motor to a steering system of a vehicle.

Furthermore, the present invention relates to a control device of an electric power steering apparatus adapted to give steering assist power to a steering system of a vehicle by driving of a motor, and more specifically, to a control device of a high-performance electric power steering apparatus that makes it possible to surely secure the convergence of the yaw rate of a vehicle.

2. Description of Related Art

In a conventional electric power steering apparatus used for vehicles, the control that a steering torque input by a driver is detected by a torque sensor, and an assist torque according to the steering torque is acquired by a motor, and given to assist steering wheel, thereby reducing the steering power input by the driver is performed. Further, in addition to such control, the electric power steering apparatus detects external environments that surround a vehicle, such as vehicle speed and steering angle, and is mounted with a control device that improves a driver's steering feeling on the basis of these detection results. In particular, the steering angle is used for, for example, steering wheel return control, and the steering wheel return control has such operation that an assist torque is added in a returning direction of a steering wheel according to the steering angle.

As such, the steering angle is a signal that is mainly used for the control of improving a steering feeling in the electric power steering apparatus. As for the steering angle, various methods of detecting the abnormality of a steering angle detector that detects the steering angle, or the abnormality a signal processor that estimates the steering angle, and various countermeasures against this abnormality are known (for example, refer to Reference 1-JP-A-8-54229, Reference 2-JP-A-2003-291842, Reference 3-JP-A-2003-252228, and Reference 4-JP-A-10-274520).

In Reference 1, in order to detect abnormality, such as a disconnection or failure, in a device pertaining to detection or calculation processing of the steering angle, a configuration, in which whether or not a value (relative steering angle value) output by a steering angle sensor, which is a steering angle detection means, falls within a predetermined range, and if the value does not falls within the predetermined range, the value is determined to be abnormality of output, is disclosed.

Further, in Reference 2, a configuration in which, when abnormality of a sensor, such as a steering angle detector that detects a steering angle signal input to a steering wheel return controlling part, has occurred due to disconnection, etc., this abnormality is detected to invalidate steering wheel return control is disclosed.

Moreover, in Reference 3, a configuration in which a case where the deviation between the rotational angle of a motor and steering angle exceeds a comparison reference value is diagnosed as abnormal, and if abnormality is determined, only use of the steering angle for control of a motor current is immediately banned is disclosed. Further, a configuration in which the steering angle is always stored, and if abnormality is determined, a previous steering angle that is stored immediately before the abnormality is determined is used for control of a motor current, and the previous steering angle is gradually reduced, thereby gradually reducing influence on the control of the motor current is also disclosed.

Further, n Reference 4, a steering angle detector in which at least three steering angle sensors that are different in phase from each other according to a change in steering angle are attached to a vehicle, and abnormality of each of the steering sensors is detected from the output state of the steering angle sensor is disclosed i.

Besides, an electric power steering apparatus that auxiliarily energizes (assist) a steering system of a vehicle with the torque of a motor is adapted such that the driving power of a motor auxiliarily energizes a steering shaft or a rack shaft by a transmission mechanism, such as a gear or a belt, via a reduction gear. Such a conventional electric power steering apparatus performs feedback control of a motor current in order to precisely generate an assist torque (steering assist power). The feedback control is control that adjusts a motor-applied voltage so that the difference between a current command value and a motor current detection value may become small. Generally, adjustment of the motor-applied voltage is performed by adjustment of a duty ratio of PWM (Pulse Width Modulation) control.

Here, to explain a general configuration of the electric power steering apparatus with reference to FIG. 13, a column shaft 1002 of a steering wheel 1001 is coupled with tie rods 1006 of steering wheels via a reduction gear 1003, universal joints 1004A and 1004B, and a pinion and rack mechanism 1005. The column shaft 1002 is provided with a torque sensor 1010 that detects the steering torque of the steering wheel 1001, and a motor 1020 that assists in exerting the steering power of the steering wheel 1001 is coupled with the column shaft 1002 via the reduction gear 1003. A control unit 1030 that controls the power steering apparatus is supplied with electric power from a battery 1014, and an ignition key signal from an ignition key 1011, and the control unit 1030 calculates a steering assist command value I of an assist command using an assist map, etc., on the basis of a steering torque value T detected by the torque sensor 1010 and a vehicle speed V detected by a vehicle speed sensor 1012, and controls a current to be supplied to the motor 1020 on the basis of the calculated steering assist command value I.

Although the control unit 1030 is mainly composed of a CPU (or MPU or MCU), the general functions to be executed by a program inside the GPU are as shown in FIG. 14.

To explain the functions and operation of the control unit 30 with reference to FIG. 14, the steering torque T that is detected and input by the torque sensor 1010 and the vehicle speed V from the vehicle speed sensor 1012 are input to the steering assist command value calculating part 1031 Where a basic steering assist command value Iref1 is calculated. The basic steering assist command value Iref1 calculated by the steering assist command value calculating part 1031 is compensated in phase by a phase compensator 1032 for enhancing the stability of the steering system, and a steering assist command value Iref2 that has been compensated in phase is input to an adder 1033. Further, the steering torque T is input to a differential compensator 1035 of a feed forward system for enhancing response speed, and a steering torque TA that has been subjected differential compensation is input to the adder 1033. The adder 1033 adds the steering assist command value Iref2 and a steering torque Td together, and inputs a steering assist command value Iref3 (=Iref2 +Td) that is the result of addition to a subtracter 1034 for feedback.

In the subtracter 1034, a difference Iref4 (=Iref3−i) between the steering assist command value Iref3 and a motor current i that is being fed back is calculated. The difference Iref4 is PI-controlled by a PI controlling part 1036, and is further input to a PWM controlling part 1037 where duty is calculated, and then PWM driving of the motor 1020 is performed via an inverter 1038. The motor current i of the motor 1020 is detected by a motor current detector (not shown), and is input and fed back to the subtracter 1034.

In a control device of such an electric power steering apparatus, a device in which a torsional torque sensor that detects the torsional torque of a steering shaft at the time of turning is provided, and the rotational direction and rotary torque of a motor are controlled according to an output signal of the torsional torque sensor is known as a device that generates moderate response at the time of sudden steering wheel operation (JP-A-45-41246 (Reference 5)).

However, such a control device has a problem in that, if output is set large, the convergence of a steering wheel may degrade due to inertia at the rime of hand-off driving of a vehicle. Further, generally, when a vehicle runs along a sharp curve with sudden operation of a steering wheel, a moderate response to the steering wheel gives a better steering feeling, and there is no means to correct auxiliary steering power (assist power) according to a turning speed. Therefore, when a vehicle runs along a curve having a small radius with sudden operation of a steering wheel, there is a problem in that the steering wheel is too light, which may cause a feeling of anxiety.

As a control device to solve such a problem, there is a control device that applies the brake on the steering angle of a steering wheel, as shown in Japanese Patent No. 2568817 (Reference 6). That is, there is provided a detection means that detects the steering angle speed of a steering system according to a command signal based on an output signal of a torsional torque sensor that detects the torsional torque of the steering system; a steering angle phase compensation command section that issues a damping signal that has determined the rotary torque of a steering wheel in its advancing direction and reverse direction according to the steering angle speed; and a driving controlling part that controls the rotational direction and rotary torque of a motor using as a command signal a signal obtained by adding a command signal based on the damping signal and the torsional torque signal of the steering system. However, since the rotary torque of the steering wheel in its advancing direction and reverse direction is generated in this control device according to a steering angular velocity, and brake is applied to movement of a steering angle, the yawing of a vehicle may diverge, and since the yawing motion and steering angle of a vehicle are not synchronized with each other, a driver's steering feeling become unnatural. Further, since brake is directly applied to movement of a steering angle, there is a problem in that the convergence speed of the steering wheel may become slow, and the vehicle may slip sideways during this period, which is dangerous.

As a means to solve this problem, there is a control device shown in JP-A-2000-95132 (Reference 7). In this control device, the rate of change of the yaw rate of a vehicle is detected, and damping is given to the yaw rate on the basis of the rate of change.

However, the electric power steering apparatuses disclosed in References 1 to 3 have a configuration in which, if it is determined that abnormality has occurred in a device related to detection of a steering angle, some of control is stopped. In this configuration, there are problems in that, when a vehicle is running, a driver's steering feeling may rapidly change due to the stop of control, the driver can not cope with the rapid change, which results in an unstable behavior of the vehicle, and the function of a control system may be reduced, thereby impairing a steering feeling. In particular, in Reference 3, although a configuration in which the steering angle is stored, and the change is gradually performed using a steering angle immediately before abnormality is determined is disclosed, there is no change in that a steering feeling may eventually be impaired, and a steering feeling loss is not suppressed.

Further, in Reference 4, although a configuration in which a plurality of steering angle sensors are attached and abnormality is detected is disclosed, there is a problem in that the configuration may become complicated and the cost may become high.

Further, the control device disclosed in the above Reference 7 performs only the control that the yaw rate is converged by braking, and cannot function to promote the yaw rate when the yaw rate falls due to disturbance. That is, when the steering wheel is released during low-speed driving, etc., the steering wheel is not returned due to disturbance, such as friction, in a case where the yaw rate converge simultaneously when the steering wheel is returned. As a result, there is a problem in that the yaw rate does not converge.

SUMMARY OF THE INVENTION

The invention provides an electric power steering apparatus with simple configuration, which makes it possible to suppress a steering feeling loss, without a rapid change in steering feeling, even if a steering angle or a steering angle estimation signal cannot be output due to occurrence of abnormality in a steering angle detection means or a steering angle estimation means.

Furthermore, the invention provides a high-performance electric power steering apparatus that makes it possible to obtain excellent steering wheel return and make a yaw rate converge in any vehicle speed state.

The present invention is mainly directed to the following items:

1. An electric power steering apparatus comprising: steering angle detection part that detects a steering angle of a steering wheel; a steering control unit that controls a motor to give an assist torque to the steering wheel; an abnormality detection part that determines an abnormality of the steering angle detection part; and a motor angle detection part that detects a rotational angle of the motor, wherein the steering control unit calculates a steering angle information based on at least a steering angle signal detected by the steering angle detection part, and the steering control unit includes a signal storage part that stores the steering angle information, and when the abnormality detection part detects an occurrence of an abnormality of the steering angle detection part, the steering control unit controls the motor and runs the motor continuously based on a steering angle information recorded in the signal storage part immediately before the occurrence of the abnormality and a motor angle signal detected by the motor angle detection part.

2. The electric power steering apparatus according to item 1, wherein the steering angle information is a steering angle midpoint signal calculated from the steering angle signal and the motor angle signal.

3. The electric power steering apparatus according to item 1, wherein the steering control unit comprises a signal arithmetic processing part that calculates an average value of the steering angle information stored in the signal storage part in a predetermined period, and when the abnormality detection part detects an occurrence of an abnormality of the steering angle detection part, the steering control unit controls the motor and runs the motor continuously based on a calculation result of the signal arithmetic processing part.

4. An electric power steering apparatus comprising: a steering angle estimation part that calculates at least one of: a steering angle estimation signal; and a steering angle estimation information based on at least the steering angle estimation signal, from signals other than a steering angle; a steering control unit that controls a motor to give an assist torque to a steering wheel; and an abnormality detection part that determines an abnormality of the signals, wherein the steering control unit includes a signal storage part that stores at least one of the steering angle estimation signal and the steering angle estimation information, and when the abnormality detection part detects an occurrence of an abnormality of the signals Other than a steering angle, the steering control unit controls the motor and runs the motor continuously based on at least one of the steering angle estimation signal and the steering angle estimation information immediately before the occurrence of the abnormality recorded in the signal storage part.

5. The electric power steering apparatus according to item 4, wherein the steering control unit comprises a signal arithmetic processing part that calculates an average value of the steering angle estimation information stored in the signal storage part to a predetermined period, and when the abnormality detection part detects an occurrence of abnormality of the signals, the steering control unit controls the motor and runs the motor continuously based on a calculation result of the signal arithmetic processing part.

6. The electric power steering apparatus according to item 1, wherein the steering control unit controls the motor and runs the motor continuously until a vehicle has stopped or until the abnormality detection part determines that the signals return to a normal state from the occurrence of the abnormality.

7. An electric power steering apparatus comprising: a motor that applies a steering assist power to a steering mechanism; a torque command value calculating part that calculates a torque command value based on a steering torque generated in a steering shaft and a vehicle speed; and a current command value calculating part that calculates a current command value of the motor based on the torque command value, wherein the motor is controlled based on the current command value, and the electric power steering apparatus further comprises; a yaw rate detecting part that detects or estimates a yaw rate of a vehicle; a target yaw rate calculating part that calculates a target yaw rate based on the vehicle speed and a steering angle; and a correcting part that calculates an amount of correction based on the yaw rate and the target yaw rate to correct the current command value.

8. The electric power steering apparatus according to item 7, wherein the target yaw rate calculating part calculates the target yaw rate by multiplying a target yaw rate value for the steering angle by a gain according to the vehicle speed.

9. The electric power steering apparatus according to item 7, wherein the correcting part calculates: a difference between the yaw rate and the target yaw rate; and the amount of correction by multiplying the difference by again according to the steering torque.

10. The electric power steering apparatus according to item 7, wherein the correcting part calculates an output value by multiplying the amount of correction by a gain according to the vehicle speed, and performs the correction of the current command value by adding the output value to the current command value.

11. The electric power steering apparatus according to items 7, wherein the yaw rate detecting part estimates the yaw rate based on a rotational speed of the motor.

Besides, other advantages and effects of some aspect of the invention will become apparent from the following description.

According to one or more embodiments of the invention, the configuration is simple, and even if signals, such as a steering angle or steering angle estimation signal, cannot be output due to occurrence of abnormality in the steering angle detection means or steering angle estimation means, the signals immediately before the abnormality has occurred is stored, and the motor is controlled and run continuously until a vehicle has stopped or until the steering angle detection means or steering angle estimation means has restored its normal state. Thus, it is possible to realize steering capable of suppressing a steering feeling loss without a rapid change in steering feeling.

According to one or more embodiments of the control device of the electric power steering apparatus of the invention, since steering torque and vehicle speed are used for convergence control, yaw rate can be surely converged in any steering state and vehicle speed. The convergence control according to the invention generates a current command value that makes the deviation of an actual yaw rate from a target yaw rate zero, i.e., generates the assist torque or braking torque of a motor. Therefore, during low speed, a return speed can be surely returned to neutrality of the steering angle θ at an arbitrary speed. Also, when a steering wheel is released during high-speed driving, the convergence speed of a vehicle is suppressed moderately, and thereby the convergence of a safe yaw rate is realized.

Moreover, even when the yaw rate falls from a yaw rate suitable for the present steering angle, the yaw rate can be controlled such that it is promoted. Thus, optimal convergence according to vehicle situations can be obtained.

One or more embodiments of the invention has a function that has a yaw rate target value according to a vehicle speed, a steering angle, and a steering torque, obtains a difference between a yaw rate signal to be detected or an estimated yaw rate value, and calculates a braking force that makes the yaw rate converge surely or an assist torque that promotes the yaw rate.

The convergence controlling part of one or more embodiment of the invention controls a damping function so that the yawing motion of a vehicle may approach a yaw rate target value from a steering angle (a steering wheel angle signal or a motor angle signal). If a yaw rate signal is smaller than a target value, this functions in a direction in which the yaw rate is positively converged early, and if a yaw rate signal is larger than a target value, this functions as a brake in a direction in which the yaw rate is converged slowly. At low speed with small yawing motion, the yawing motion is promoted positively, and at high speed with large yawing motion, gain adjustment is made by a vehicle speed response table so that the yawing motion can be converged positively. Further, since there is a possibility that a steering feeling may be influenced in a mode in which a driver tries to positively make a yawing motion or in a mode (state with a torque input) in which the driver tries to make a yawing motion converge, a response table according to a vehicle speed is given. Accordingly, the yaw rate can be surely converged in any steering state and vehicle speed.

DETAILED DESCRIPTION OF EXEMPLARY EMBODIMENTS OF THE INVENTION

Hereinafter, embodiments according to the invention will be described with reference to the accompanying drawings.

First Embodiment

Figure 1:
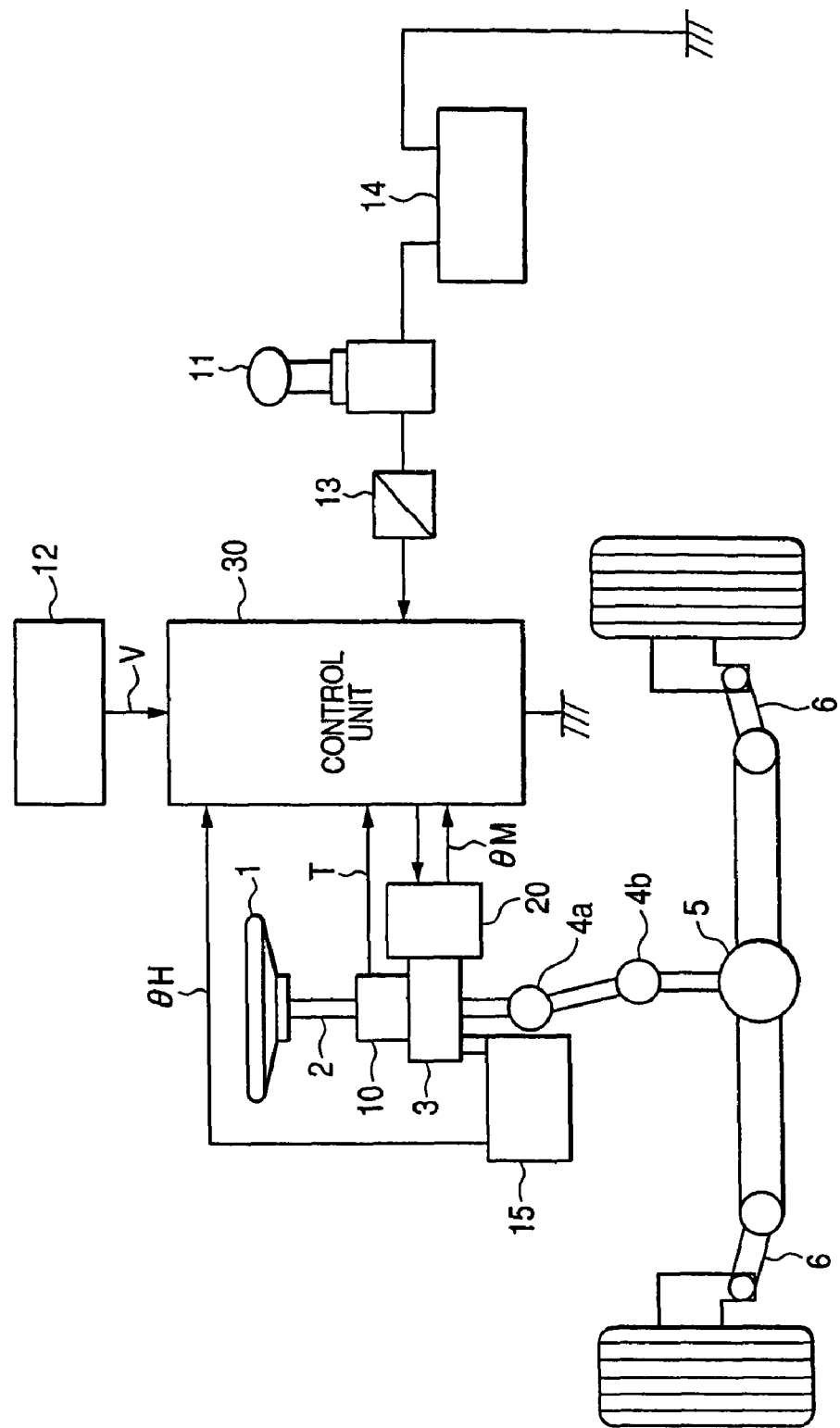
FIG. 1 is a schematic view showing the configuration of an electric power steering apparatus according to the first embodiment of the invention.
Figure 2:
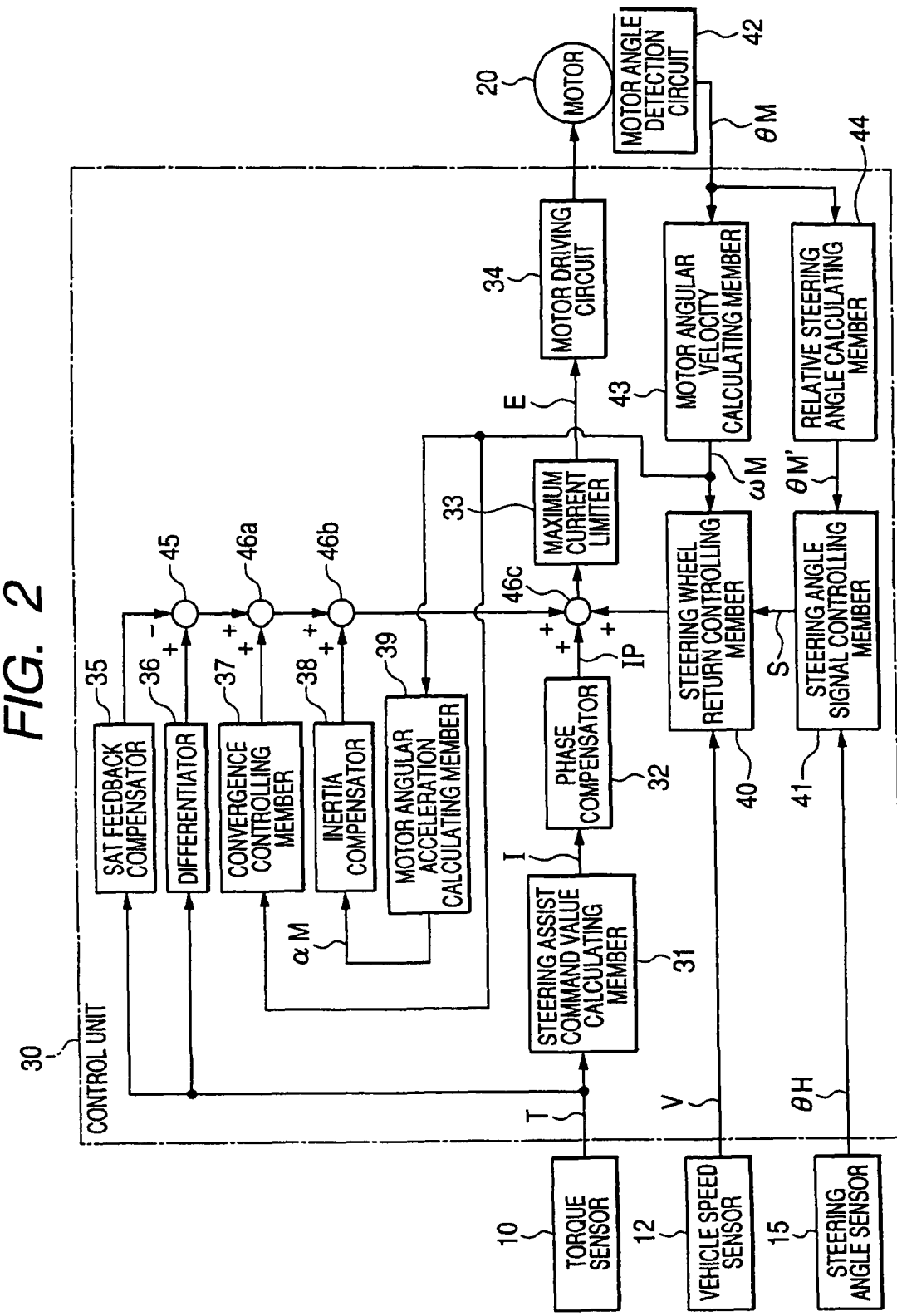
FIG. 2 is a block diagram showing the configuration of a control unit of the electric power steering apparatus according to the first embodiment.

FIG. 1 is a view showing the configuration of an electric power steering apparatus according to the present embodiment. FIG. 2 is a block diagram showing the flow of the assist control of a control unit 30.

In the electric power steering apparatus, as shown in FIG. 1, a column shaft 2 of a steering wheel 1 is coupled with tie rods 6 of steering wheels via a reduction gear 3, universal joints 4a and 4b, and a pinion and rack mechanism 5. The column shaft 2 is provided with a torque sensor 10 that detects the steering torque of the steering wheel 1, and a motor 20 that assists in effecting the steering power of the steering wheel 1 is coupled with the column shaft 2 via the reduction gear 3. A steering angle sensor 15 that detects the steering angle of the steering wheel 1 is attached to the reduction gear 3. Further, the motor 20 is mounted with, for example, a motor angle detection circuit 42, such as a resolver, that detects the angle of rotation of a motor (refer to FIG. 2). Electric power is supplied from a battery 14 via an ignition key 11 and a relay 13 to the control unit 30 that is a steering control unit that controls the electric power steering apparatus. Further, a steering torque signal T detected by the torque sensor 10, a vehicle speed signal V detected by a vehicle speed sensor 12, a steering angle signal $\theta_H$ detected by the steering angle sensor 15, and a motor angle signal $\theta_M$ detected by the motor angle detection circuit are input to the control unit 30. The control circuit performs calculation of the steering assist command value I of an assist command, and controls a current (assist current) to be supplied to the motor 20 on the basis of the calculated steering assist command value I, thereby performing the assist control.

The control unit 30 is mainly composed of a CPU, a ROM, a RAM, an interface circuit, etc. The control unit reads a program stored in the ROM, etc., and carries out the assist control.

As shown in FIG. 2, the control unit 30 includes a steering assist command value calculating part 31, a phase compensator 32, a maximum current limiter 33, a motor driving circuit 34, an SAT feedback compensator 35, a differentiator 36, a convergence controlling part 37, an inertia compensator 38, a steering wheel return controlling part 40, a steering angle signal controlling part 41, a motor angular velocity calculating part 43, a motor angular acceleration calculating part 39, and a relative steering angle calculating part 44, a subtracter 45, and adders 46a, 46b, and 46c. Further, signals, such as the steering torque signal T, the vehicle speed signal V, the steering angle signal $\theta_H$, and the motor angle signal $\theta_M$, which are input to the control unit 30 from outside, are converted into digital signals from analog signals in an A/D converter (not shown) so that they can be calculated by the control unit 30. In addition, signals, such as the vehicle speed signal V, may be input to the control unit 30 via a digital communication line, such as a vehicle-installed CAN. Further, wave processing is performed properly.

The steering torque signal T resulting from operation of the steering wheel 1 by a driver is detected by the torque sensor 10, is then properly subjected to amplification processing, filtering processing, etc., and then input to the steering assist command value calculating part 31.

The steering assist command value calculating part 31 outputs a control steering assist command value I to be supplied to a motor on the basis of the input steering torque signal T. Further, the control steering assist command value I is determined with reference to a prepared assist map so that it may become such a large value that the steering torque signal T shows a large value. In this case, when the steering torque signal T shows a value more than a predetermined value, the steering assist command value calculating part 31 limits the output of the control steering assist command value I to a proper value in consideration of steering safety. This reduces the steering power to be input by a driver, and stabilizes the behavior of a vehicle.

The control steering assist command value I output by the steering assist command value calculating part 31 is input to the phase compensator 32. The phase compensator 32 performs phase compensation on the control steering assist command value I, and outputs a control steering assist command value $I_p$ that has been subjected to the phase compensation. This will allow the phase compensator 32 to improve transient characteristics, and stabilize a control system.

Meanwhile, the steering torque signal T is input to the SAT feedback compensator 35 and the differentiator 36.

The steering torque signal T is input to the SAT feedback compensator 35. The SAT feedback compensator corrects the control steering assist command value I in a direction that assists in operating the steering wheel 1, and improves return of the steering wheel 1 after steering. Further, in the differentiator 36, the steering torque signal T is fetched, and the control steering assist command value I is corrected according to a fluctuation in the steering torque signal T, thereby suppressing a fluctuation in assist torque by the motor 20.

A motor angular velocity $\omega_M$ calculated and output by the motor angular velocity calculating part 43 is input to the convergence compensator 37 in order to improve the convergence of a vehicle. The convergence compensator corrects the control steering assist command value I so as to brake the swinging operation of the steering wheel 1, and stabilizes the behavior of the steering wheel 1 after steering.

Also, the motor angular acceleration $a_M$ calculated and output by the motor angular acceleration calculating part 39 is input to the inertia compensator 38. The inertia compensator corrects the control steering assist command value I according to fluctuation of an inertia system related to drive systems, such as the steering wheel 1, the pinion and rack mechanism 5, the motor 20, and the reduction gear 3, thereby controlling a fluctuation in assist torque. This prevents the inertia of a drive system from being transmitted to a driver, and improves a steering feeling.

Here, the subtracter 45 subtracts the output of the differentiator 36 from the output of the SAT feedback compensator 35. Moreover, the output of the subtracter 45 is added to the output of the convergence controlling part 37 and the output of the inertia compensator 38 by the adders 46a and 46b, and then input to the adder 46c, Further, in the motor angular velocity calculating part 43, the motor angle signal $\theta_M$ is fetched from the motor angle detection circuit 42 composed of, for example, a resolver, and for example, differential processing, etc. is performed on the motor angle signal $\theta_M$ to obtain the motor angular velocity signal $\omega_M$. The motor angular velocity signal $\omega_M$ is input to the steering wheel return controlling part 40, the motor angular acceleration calculating part 39, and the convergence controlling part 37.

In the steering wheel return controlling part 40, the motor angle vehicle speed signal $\omega_M$, the vehicle speed signal V detected by the vehicle speed sensor, and a signal S that is the output of the steering angle signal controlling part 41 as will be described below, are input, and the control steering assist command value I is corrected according to the steering angle of the steering wheel 1 with respect to the straight advancement state of a vehicle in order to give a more natural steering feeling. More specifically, the steering wheel return controlling part 40 controls output mainly according to the signal S. That is, the steering wheel return controlling part performs the steering wheel return control with a large assist torque if the signal S is determined to be large, and performs the steering wheel return control with a small assist torque when the signal S is determined to be small. Further, the output of the steering wheel return controlling part 40 is adjusted on the basis of the motor angular velocity signal $\omega_M$ and the vehicle speed signal V. For example, if the vehicle speed V is large, the steering wheel return controlling part corrects the control steering assist command value I so that the assist torque may become small, even when the signal S is constant. This makes it possible for a driver to feel comfortable steering.

As described above, in the motor angular velocity calculating part 43, the motor angle signal $\theta_M$ is input, and for example, differential processing, etc., is performed to obtain the motor angular velocity signal $\omega_M$ which is in turn output to the steering wheel return controlling part 40, the convergence controlling part 37, and the motor angular acceleration calculating part 39. Further, the motor angular velocity signal $\omega_M$ is input to the motor angular acceleration, calculating part 39, and the motor angular acceleration calculating part performs, for example, differential processing, etc. to calculate the motor angular acceleration $a_M$ and output it to the inertia compensator 38. Feedback control is realized by the return configuration.

Further, the relative steering angle calculating part 44 fetches the motor angle signal $\theta_M$, multiplies it by a reduction ratio of the reduction gear 3 attached to the motor 20 so as to deal with it equivalently to the steering angle signal $\theta_H$ to obtain a relative steering angle signal $\theta_M'$, and outputs the result to the steering angle controlling part 41.

The steering angle signal controlling part 41 performs calculation processing on the basis of the steering angle signal $\theta_H$ and the relative steering angle signal $\theta_M'$, and outputs the signal S that is the calculation result to the steering wheel return controlling part.

The adder 46c performs addition processing on the output of the adder 46b, the output of the steering wheel return controlling part 40, and the control steering assist command value $I_p$, and inputs the resulting output to the maximum current limiter 33. The maximum current limiter 33 limits a maximum current to be input to the motor 20 to a proper value in order to prevent damage of the control unit 30 and the motor by an overcurrent. From the above, a current command value E to be supplied to the motor is input to the motor driving circuit 34.

In the present embodiment, a brushless motor is used as the motor 20. A plurality of N poles and S poles are alternately arranged and fixed around the circumference of a rotor of the brushless motor, and stator coils are arranged in a circumferential direction so as to surround the rotor. Further, a Hall element as a magnetic pole position detecting element is used for the brushless motor, the phase of a magnetic pole of the rotor is detected by the Hall element, and a current passing through each of the stator coils is selectively switched according to the detected phase, thereby obtaining rotary torque.

The motor driving circuit 34 performs supply and switching of the current, and performs such an operation that the current control value E is attained. This realizes the assist control of adding the assist torque by the motor 20 to a steering system.

Figure 3:
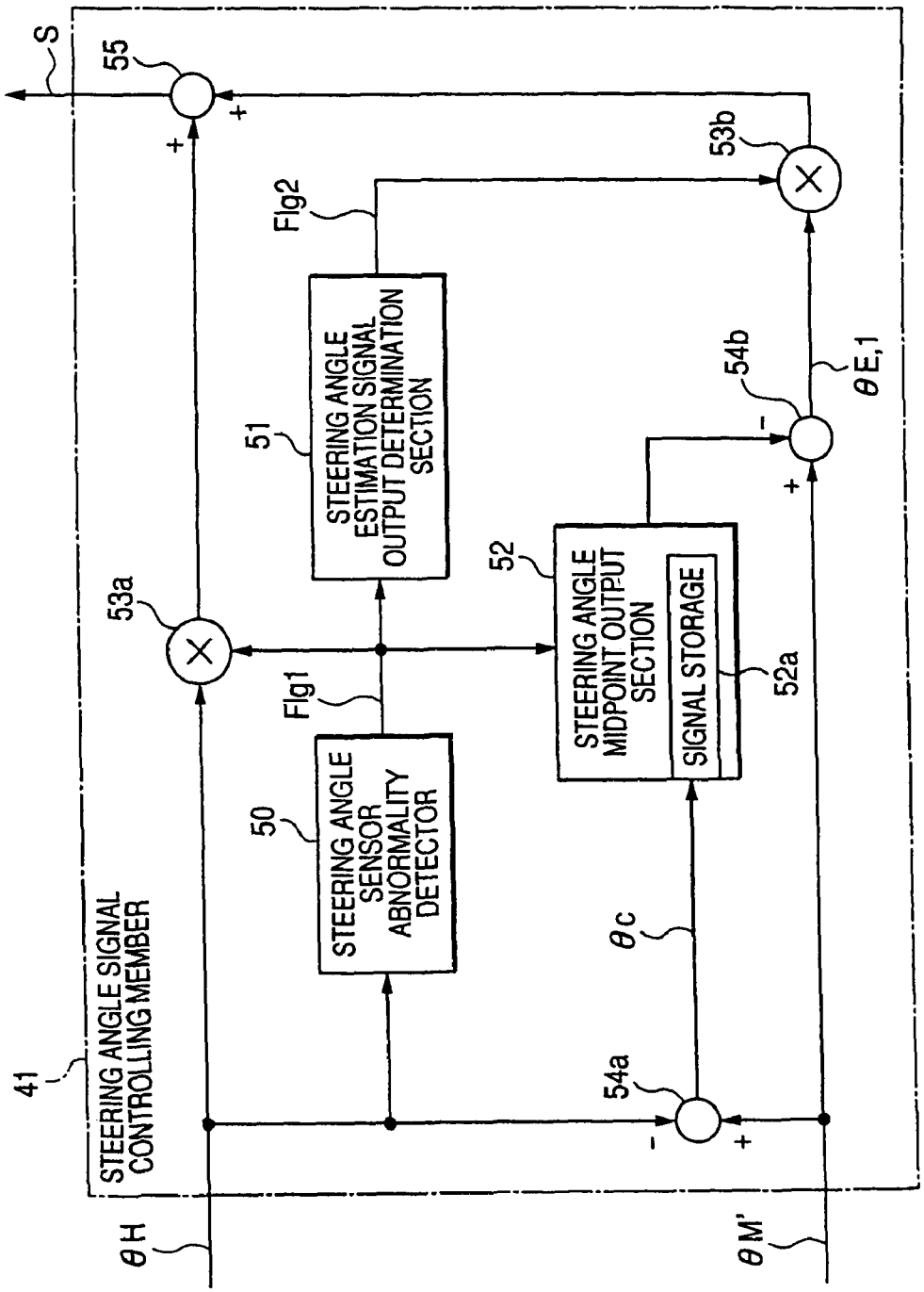
FIG. 3 is a block diagram of a steering angle signal controlling part according to the first embodiment.

Moreover, the steering angle signal controlling part 41 will be described in detail with reference to FIG. 3. FIG. 3 is a block diagram according to the steering angle signal controlling part 41.

The steering angle signal controlling part 41 according to the present embodiment include a steering angle sensor abnormality detector (abnormality detection means) 50, a steering angle estimation signal output determination section 51, a steering angle midpoint output section 52, an adder 55, subtracters 54a and 54b, and multipliers 53a and 53b.

The steering angle sensor abnormality detector 50 fetches the steering angle signal $\theta_H$, and performs occurrence of abnormality, such as failure or disconnection of the steering angle sensor, from the steering angle signal $\theta_H$. A value Flg1 is output on the basis of this detection result. That is, the steering angle sensor abnormality detector 50 sets "1" to the value Flg1 if it is determined to be normal, and sets "0" to the value Flg1 if it is determined to be abnormal, then outputs the value Flg1.

The value Flg1 is input to the steering angle estimation signal output determination section 51. The steering angle estimation signal output determination section sets "0" to a value Flg2 if the value Flg1 is "1", and sets "1" to the value Flg2 if the value Flg1 is "0", then output the value Flg2. In addition, the steering angle sensor abnormality detector 50 detects the occurrence of abnormality at a predetermined cycle until a vehicle has stopped, or until the steering sensor abnormality detector 50 determines that the steering angle sensor 15 has returned to its normal state from occurrence of abnormality thereof, that is, as long as electric power continues to be supplied to the control unit 30.

On the other hand, the steering angle signal $\theta_H$ and the relative steering angle signal $\theta_M'$ are input to the subtracter 54a, and the subtracter subtracts the steering angle signal $\theta_H$ from the relative steering angle signal $\theta_M'$ to calculate a steering angle midpoint signal $\theta_C$, and output the steering angle midpoint signal $\theta_C$ to the steering angle midpoint output section 52.

The steering angle midpoint signal $\theta_C$ and the value Flg1 that is the output of the steering angle sensor abnormality detector 50 are input to the steering angle midpoint output section 52. The steering angle midpoint output section 52 determines a value to be output to the subtracter 54b on the basis of the above signals, and includes a signal storage 52a that stores the steering angle midpoint signal $\theta_C$ that is input serially. The signal storage 52a stores the steering angle midpoint signal $\theta_C$ at a predetermined cycle. By this configuration, in the steering angle midpoint output section 52, if the value Flg1 is set to "1", a steering angle midpoint signal $\theta_C$ that is currently fetched and stored is output from the signal storage 52a, and if the value Flg1 is set to "0", a steering angle midpoint signal $\theta_C$ before one cycle, that is, a steering angle midpoint signal $\theta_C$ immediately before occurrence of abnormality, is output from the signal storage. The output result is input to the subtracter 54b, and the subtracter subtracts the relative steering angle $\theta_M'$ from the output of the steering angle midpoint output section 52, and thereby outputs the steering angle estimation signal $\theta_{E,1}$.

The steering angle estimation signal $\theta_{E,1}$ is input to the multiplier 53b, and multiplied by the value Flg2, and the result is input to the adder 55. On the other hand, in the multiplier 53a, the steering angle signal $\theta_H$ detected by the steering angle sensor 15 is multiplied by the value Flg1, and the result is input to the adder 55.

In the adder 55, the output result of the multiplier 53a and the output result of the multiplier 53b are added together to obtain a signal S, and the signal S is then output to the steering wheel return controlling part 40.

Figure 4:
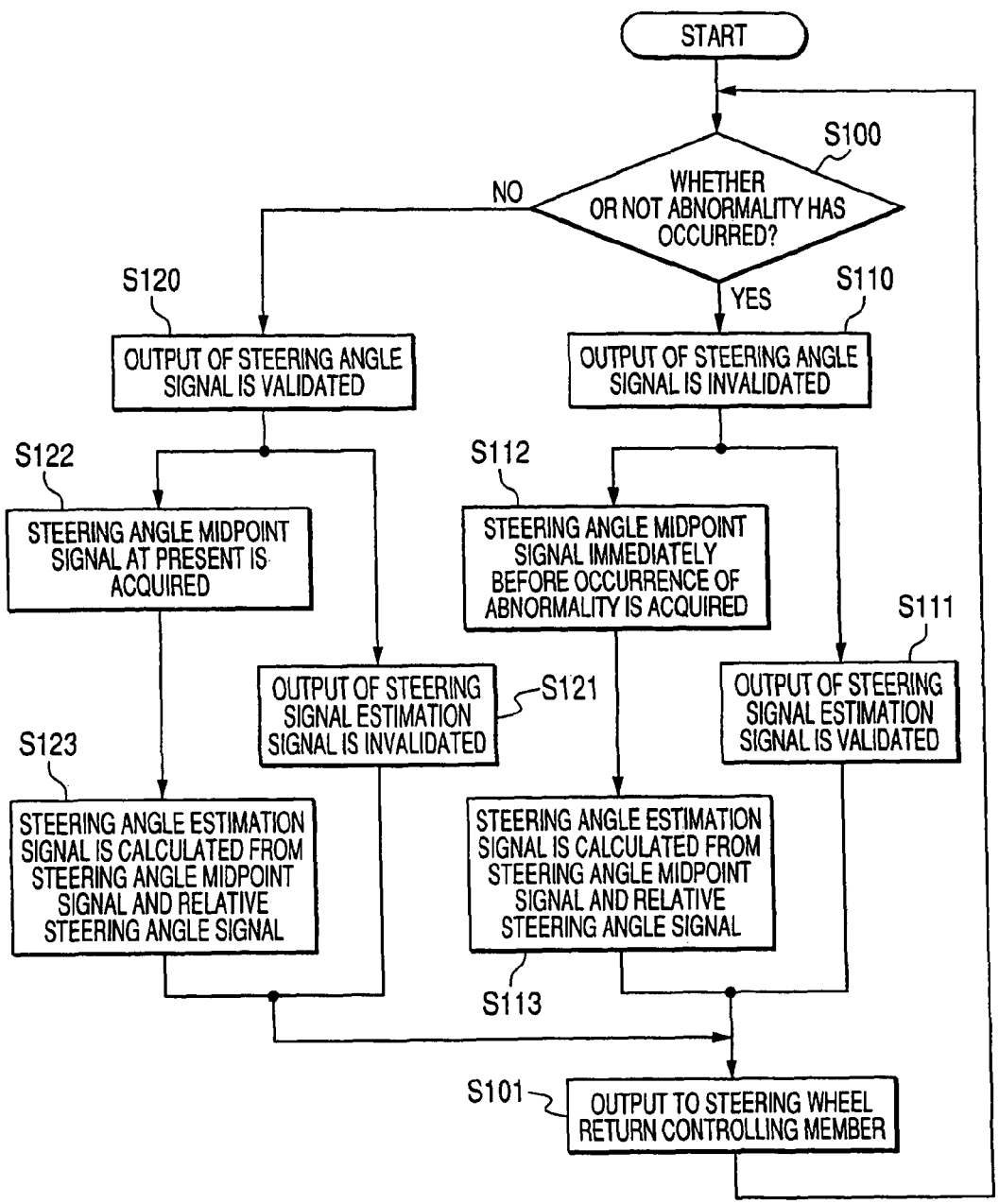
FIG. 4 is a flow chart showing the operation of the steering angle signal controlling part in the first embodiment.

Next, a flow during the operation of the steering angle signal controlling part 41 in the above-described configuration will be described according to the flow chart of FIG. 4.

The steering angle sensor abnormality detector 50 determines whether or not abnormality, such as failure or disconnection of the steering angle sensor, has occurred (that is, S100). If occurrence of abnormality has been detected, output is invalidated so that the steering angle signal $\theta_H$ may not be output to the steering wheel return controlling part 40 (that is, S110), and output is validated so that the steering signal estimation signal $\theta_{E,1}$ may not be output to the steering wheel return controlling part 40 (that is, S111). Here, the steering angle midpoint output section 52 acquires and outputs from the signal storage 52a a steering angle midpoint signal $\theta_C$ before one cycle from when abnormality has occurred from the signal storage 52a (S112). Next, a steering angle estimation signal $\theta_{E,1}$ is calculated from the steering angle midpoint signal $\theta_C$ and the relative steering angle signal $\theta_M'$ (S113), and output to the steering wheel return controlling part 40 (S101). As a result, if occurrence of abnormality has occurred, the steering angle estimation signal $\theta_{E,1}$ calculated by the steering angle midpoint signal $\theta_C$ before one cycle from when abnormality has occurred is input to the steering wheel return controlling part 40.

If occurrence of abnormality has not been detected, output is validated so that the steering angle signal $\theta_H$ maybe output to the steering wheel return controlling part 40 (that is, S120), and output is invalidated so that the steering signal estimation signal $\theta_{E,1}$ may not be output to the steering wheel return controlling part 40 (that is, S121). Here, the steering angle midpoint output section 52 acquires and outputs the present steering angle midpoint signal $\theta_C$ from the steering angle storage 52a. Then, the steering angle estimation signal $\theta_{E,1}$ is calculated from the steering angle midpoint signal $\theta_C$ and the relative steering angle signal $\theta_M'$. However, since the output of the estimation signal is invalidated, the steering angle estimation signal $\theta_{E,1}$ is net output to the steering wheel return controlling part 40, but the steering angle signal $\theta_H$ detected by the steering angle sensor is directly input the steering wheel return controlling part 40.

Accordingly, according to the present embodiment, the control unit 30 calculates the steering angle midpoint signal $\theta_C$ from the steering angle signal $\theta_H$ detected by the steering angle sensor 15 and the motor angle signal $\theta_M$ detected by the motor angle detection circuit 42, and includes the signal storage 52a that stores the steering angle midpoint signal $\theta_C$. If the steering angle sensor abnormality detector 52 has detected occurrence of abnormality of the steering angle sensor 15, the control unit controls the motor 20 and runs it continuously on the basis of the motor angle signal $\theta_M$, and the steering angle midpoint signal $\theta_C$ immediately before occurrence of abnormality that is stored in the signal storage 52a. Thus, a steering feeling does not change abruptly, and the comfortable steering that a steering feeling loss can be suppressed can be realized.

Further, according to the present embodiment, the control unit 30 controls the motor 20 and runs it continuously until a vehicle has stopped, or until the steering sensor abnormality detector 50 determines that the steering sensor has returned to its normal state from occurrence of abnormality. Thus, as long as a driver steers the steering wheel 1, a steering feeling loss can be suppressed, and more safe and comfortable steering can be realized.

Second Embodiment

Figure 5:
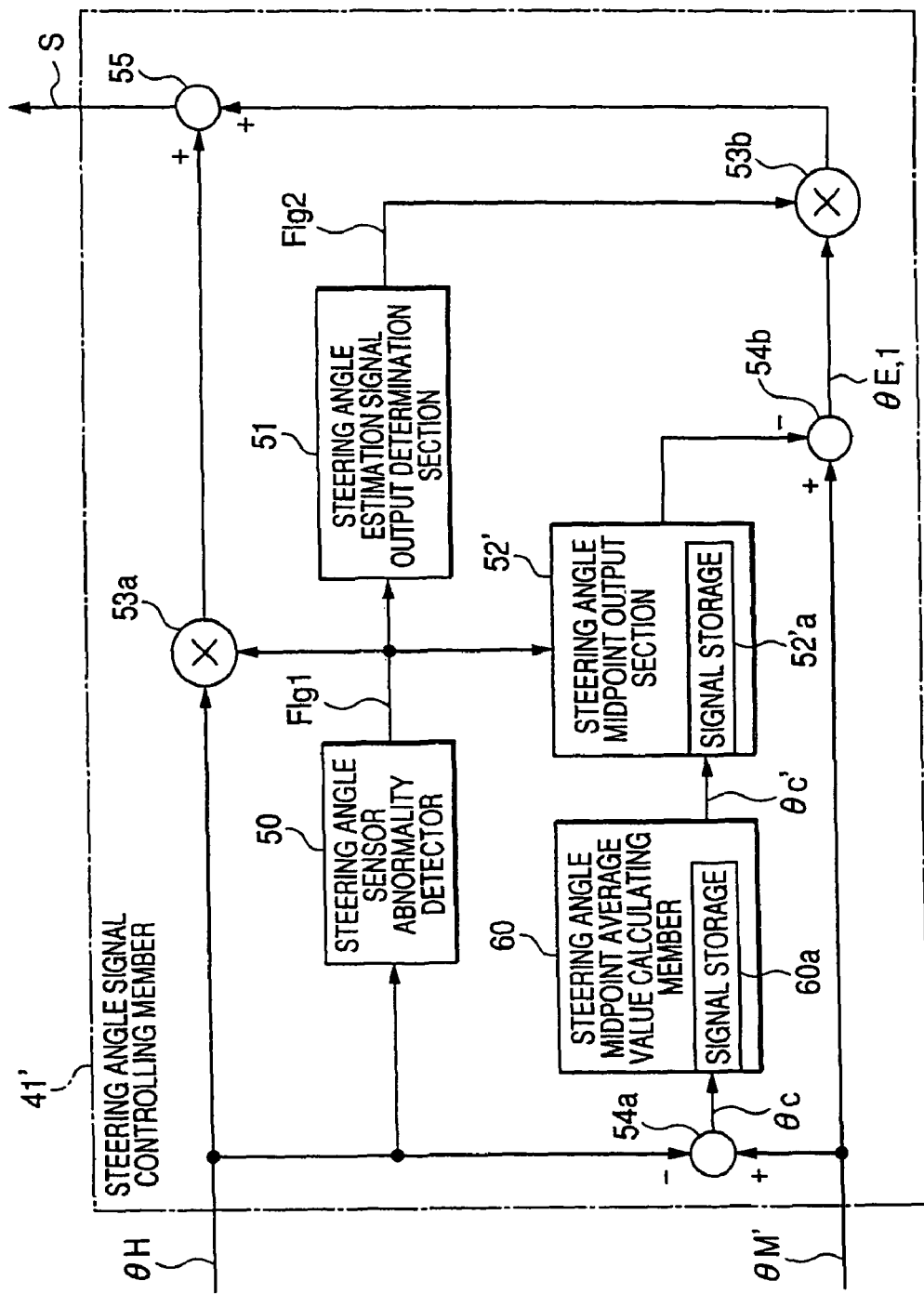
FIG. 5 is a block diagram of a steering angle signal controlling part according to a second embodiment.
Figure 6:
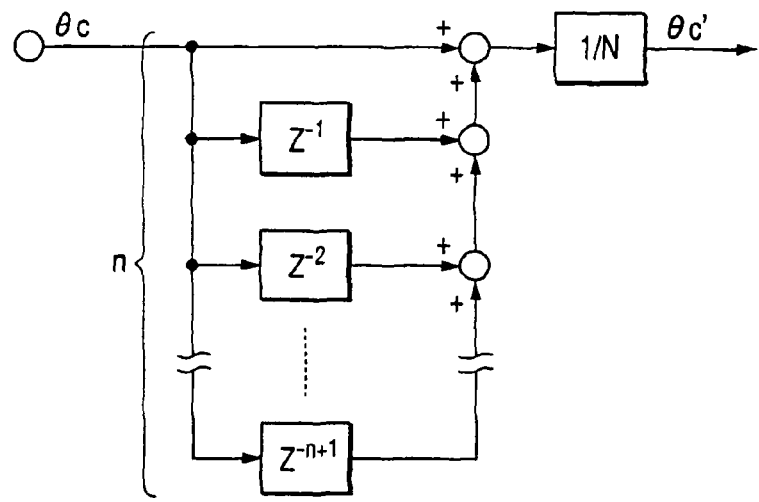
FIG. 6 is a block diagram of the steering angle mid point average value calculating part in the second embodiment

A modified example of the first embodiment according to the invention will be described with reference to FIGS. 5 and 6. FIG. 5 is a block diagram of the steering angle signal controlling part according to the present embodiment, and FIG. 6 is a block diagram of a steering angle midpoint average value calculating part. The present embodiment has a configuration in which a steering angle midpoint average value calculating part is provided in the configuration of the first embodiment as described above.

In the present embodiment, as shown in FIG. 5, a steering angle midpoint average value calculating part 60 having a signal storage 60a is provided in a steering angle signal controlling part 41'.

The signal storage 60a in the steering angle midpoint average value calculating part 60 stores a steering angle midpoint signal $\theta_C$ that is serially input at a predetermined cycle. The steering angle midpoint average value calculating part 60, as shown in FIG. 6, is composed of delay elements $Z^{-1}, Z^{-2}, \ldots, Z^{-n+1}$ from before one cycle to before an N-1 cycle, and the steering angle midpoint average value calculating part calculates signals from a steering angle midpoint signal $\theta_C$ before the N-1 cycle to a steering angle midpoint signal $\theta_C$ when abnormality has occurred, among a plurality of steering angle midpoints signals $\theta_C$ stored in the signal storage 60a, on the basis of a value N (where N is a natural number), sums up these signals, multiplies the resulting sum by a value 1/N to obtain an average steering angle midpoint signal $\theta_C'$, and then outputs the average steering angle midpoint signal $\theta_C'$ to a steering angle midpoint output section 52'. In addition, the value N is a present value that can be serially changed from outside.

The average steering angle midpoint signal $\theta_C'$ and the value Flg1 that is the output of the steering angle sensor abnormality detector 50 are input to the steering angle midpoint output section 52'. The steering angle midpoint output section 52' determines a value to be output to the subtracter 54b on the basis of the above signals, and includes the signal storage 52'a that stores the average steering angle midpoint signal $\theta_C'$ that is serially input. The signal storage 52'a stores the average steering angle midpoint signal $\theta_C'$ at a predetermined cycle. By this configuration, in the steering angle midpoint output section 52', if the value Flg1 is set to "1", an average steering angle midpoint signal $\theta_C'$ that is currently fetched and stored is output from the signal storage 52'a, and if the value Flg1 is set to "0", an average steering angle midpoint signal $\theta_C'$ before one cycle, that is, a steering angle midpoint signal $\theta_C'$ immediately before occurrence of abnormality, is output from the signal storage. The other aspects are the same as those of the first embodiment.

Accordingly, according to the present embodiment, the same operational effects as those of the first embodiment are exhibited, and particularly, a steering angle midpoint is calculated from the average value of a plurality of average steering angle midpoints. Thus, a precise steering angle estimation signal can be calculated and output to the steering wheel return controlling part according to occurrence of abnormality, and a steering feeling loss can be further suppressed.

Third Embodiment

Figure 7:
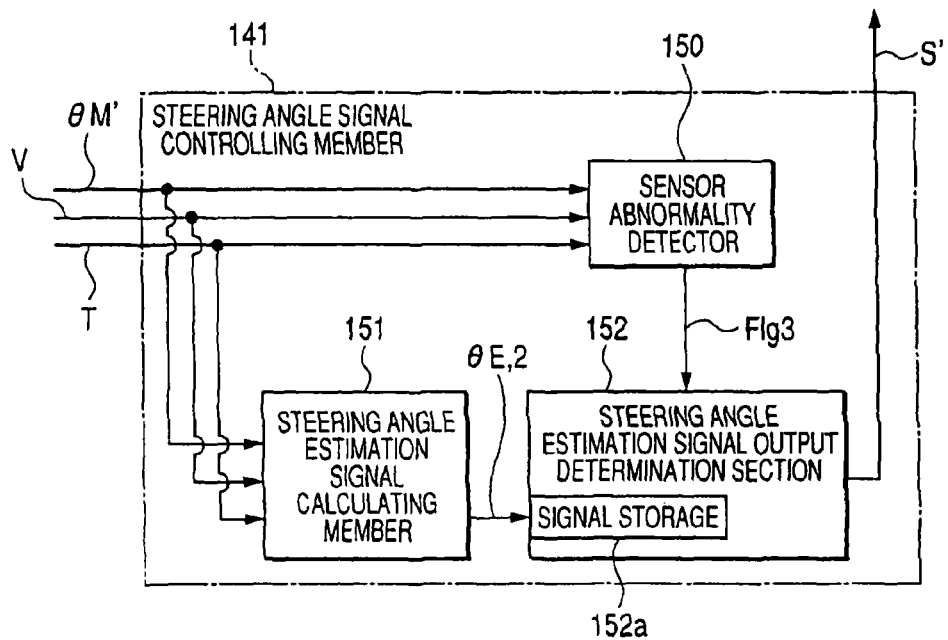
FIG. 7 is a block diagram of a steering angle signal controlling part according to a third embodiment.

Further, still another embodiment according to the invention will be described with reference to FIG. 7. FIG. 7 is a block diagram of a steering angle signal controlling part according to the present embodiment.

Unlike the first embodiment, an electric power steering apparatus (not shown) according to the present embodiment has a configuration in which the steering angle sensor is not provided, and in which a steering angle estimation signal is calculated from signals detected by detection means other than the steering angle sensor, for example, a steering torque signal T, a relative steering angle signal $\theta_M'$, and a vehicle Speed signal V, thereby controlling the motor 20 to add assist torque to steering.

A steering angle signal controlling part 141 in this configuration, as shown in FIG. 7, includes a sensor abnormality detector 150, a steering angle estimation signal calculating part 151, and a steering angle estimation signal output determination section 152. Since the overall block configuration in the present embodiment is basically the same as that of the first embodiment shown in FIG. 2 except steering angle sensor, the description of the overall block configuration is omitted.

The signals including the steering torque signal T, the relative steering angle signal $\theta_M'$, and the vehicle speed signal V are input to the sensor abnormality detector 150 where occurrence of abnormality of these signals is detected. A value Flg3 is output on the basis of this detection result. That is, the sensor abnormality detector 150 sets "1" to the value Flg3 if it is determined to be normal, and sets "0" to the value Flg3 if it is determined to be abnormal, and then outputs the value Flg3.

Further, in the steering angle estimation signal calculating part 151, a steering angle estimation signal $\theta_{E,2}$ is calculated from the signals including the steering torque signal T, the relative steering angle signal $\theta_M'$, and the vehicle speed signal V, and is output to the steering angle estimation signal output determination section 152.

Then, the value Flg3 and the steering angle estimation signal $\theta_{E,2}$ are input to the steering angle estimation signal output determination section 152. The steering angle estimation signal output determination section 152 determines a signal S' to be output to the steering wheel return controlling part 40 on the basis of the above signals, and includes a signal storage 152a that stores the steering angle estimation signal $\theta_{E,2}$ that is input serially. By this configuration, in the steering angle estimation signal output determination section 152, if the value Flg3 is set to "1", the steering angle estimation signal $\theta_{E,2}$ currently fetched and stored In the signal storage 152a is set to the signal S', and if the value Flg3 is set to "0", the steering angle estimation signal $\theta_{E,2}$ before one cycle, that is, the steering angle estimation signal $\theta_{E,2}$ immediately before occurrence of abnormality is set to the signal S'. As a result, the signal S' is input the steering wheel return controlling part 40.

Accordingly, according to the present embodiment, the control unit includes the signal storage 152a that stores the steering angle estimation signal $\theta_{E,2}$. Also, if the sensor abnormality detector 150 has detected occurrence of abnormality of the signals including the steering torque signal T, the relative steering angle signal $\theta_M'$, and the vehicle speed signal V, the control unit controls the motor 20 and runs it continuously on the basis of the steering angle estimation signal $\theta_{E,2}$ immediately before occurrence of abnormality that is stored in the signal storage 152a. Thus, a steering feeling does not change abruptly, and the safe and comfortable steering that a steering feeling loss can be suppressed can be realized.

Further, according to the present embodiment, the control unit controls the motor 20 and runs it continuously until a vehicle has stopped, or until the steering sensor abnormality detector 50 determines that the signals have returned to its normal state from occurrence of abnormality. Thus, as long as a driver steers the steering wheel 1, a steering feeling loss can be suppressed, and more safe and comfortable steering can be realized.

Fourth Embodiment

Figure 8:
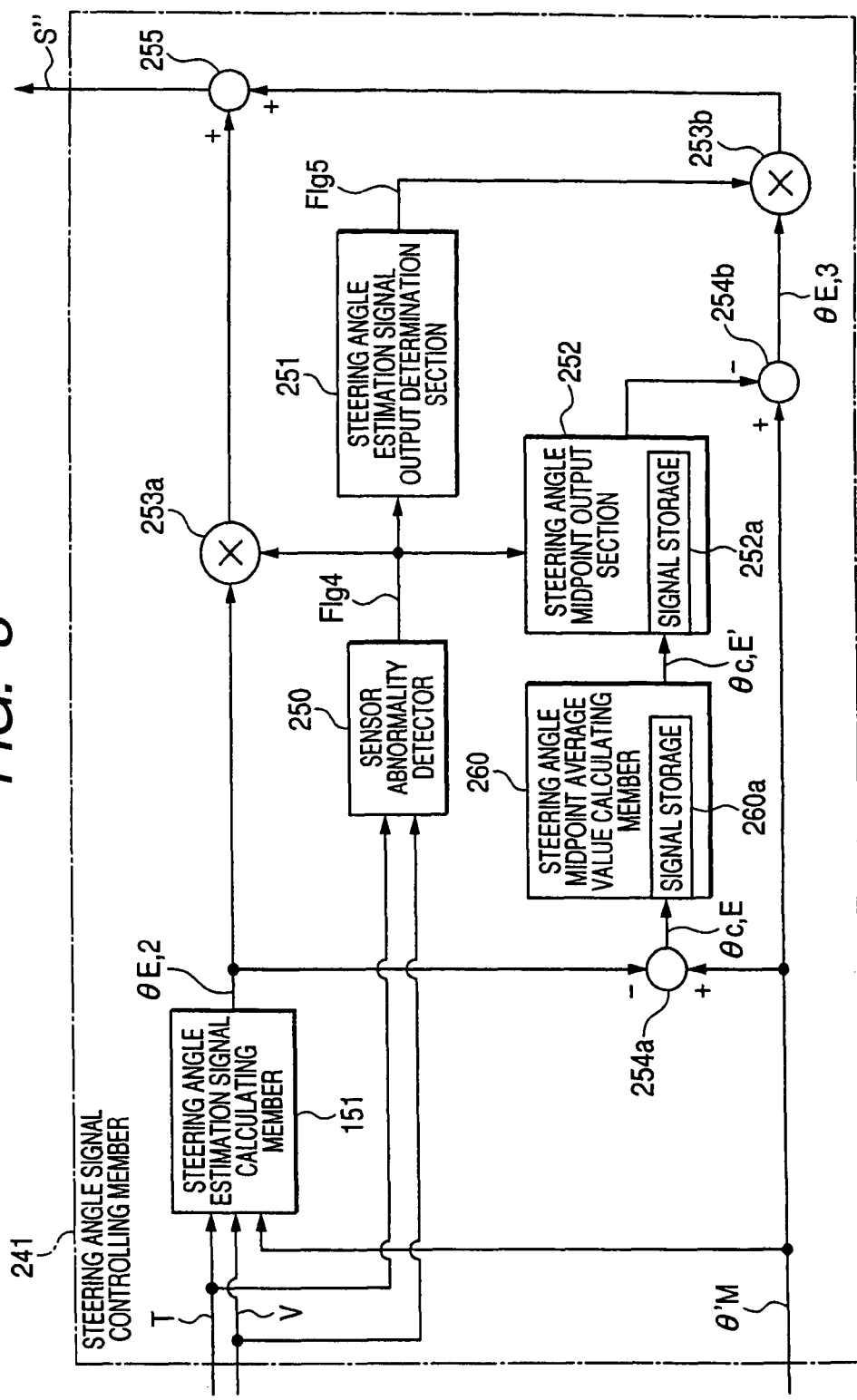
FIG. 8 is a block diagram of the steering angle signal controlling part in the fourth embodiment.

A fourth embodiment according to the invention will be described with reference to FIG. 8. FIG. 8 is a block diagram of a steering angle signal controlling part according to the present embodiment. The present embodiment has a configuration in which a steering angle midpoint average value calculating part 260 and a steering angle midpoint output section 252 are provided in the configuration of the third embodiment as described above. In addition, similarly to the third embodiment, an electric power steering apparatus (not shown) according to the present embodiment has a configuration in which the steering angle sensor is not provided, and in which a steering angle estimation signal is calculated from signals detected by detection means other than the steering angle sensor, for example, a steering torque signal T, a relative steering angle signal $\theta_M'$, and a vehicle speed signal V, thereby controlling the motor 20 to add assist torque to steering.

As shown in FIG. 8, the steering angle control unit 241 according to the present embodiment includes a steering angle estimation signal calculating part 151, a sensor abnormality detector 250, a steering angle estimation signal output determination section 251, a steering angle midpoint average value calculating part 260, a steering angle midpoint output section 252, an adder 255, subtracters 254a and 254b, and multipliers 253a and 253b.

In the steering angle estimation signal calculating part 151, a steering angle estimation signal $\theta_{E,2}$ is calculated from the steering torque signal T, the vehicle speed signal V, and the relative steering angle signal $\theta_M{}'$, and is output to the multiplier 253a and the subtracter 254a.

The sensor abnormality detector 250 fetches the steering torque signal T and the vehicle speed signal V, and detects occurrence of abnormality from these signals, A value Flg4 is output on the basis of this detection result. That is, the sensor abnormality detector 250 sets "1" to the value Flg4 if it is determined to be normal, and sets "0" to the value Flg4 if it is determined to be abnormal, and then outputs the value Flg4.

The value Flg4 is input to the steering angle estimation signal output determination section 251. The steering angle estimation signal output determination section sets "0" to a value Flg5 if the value Flg4 is "1", and sets "1" to the value Flg5 if the value Flg4 is "0", then outputs the value Flg5.

Meanwhile, the steering angle estimation signal $\theta_{E,2}$ and the relative steering angle signal $\theta_M{}'$ is input to the subtracter 254a where the steering angle estimation signal $\theta_{E,2}$ is subtracted from the relative steering angle signal $\theta_M{}'$ to obtain a steering angle midpoint estimation signal $\theta_{C,E}$, and the steering angle midpoint estimation signal $\theta_{C,E}$ is output to the steering angle midpoint average value calculating part 260.

The steering angle midpoint average value calculating part 260 includes a signal storage 260a. The signal storage 260a stores the steering angle midpoint estimation signal $\theta_{C,E}$ that is input serially at a predetermined cycle. The steering angle midpoint average value calculating part 260, similar to the second embodiment (refer to FIG. 6), is composed of delay elements $Z^{-1}, Z_{-2}, \ldots, Z^{-n+1}$ from before one cycle to before an N-1 cycle, and the steering angle midpoint average value calculating part calculates signals from a steering angle midpoint estimation signal $\theta_{C,E}$ before the N-1 cycle to a steering angle midpoint estimation signal $\theta_{C,E}$ when abnormality has occurred, among a plurality of steering angle midpoints estimation signals $\theta_{C,E}$ stored in the signal storage 260a, on the basis of a value N (where N is a natural number), sums up these signals, multiplies the resulting sum by a value 1/N to obtain an average steering angle midpoint estimation signal $\theta_{C,E}{}'$, and then outputs the average steering angle midpoint estimation signal $\theta_{C,E}{}'$ to a steering angle midpoint output section 252.

The average steering angle midpoint estimation signal $\theta_{C,E}{}'$ and the value Flg4 that is the output of the sensor abnormality detector 250 are input to the steering angle midpoint output section 252. The steering angle midpoint output section 252 determines a value to be output to the subtracter 254b on the basis of the above signals, and includes the signal storage 252a that stores the average steering angle midpoint estimation signal $\theta_{C,E}{}'$ that is serially input. The signal storage 252a stores the average steering angle midpoint estimation signal $\theta_{C,E}{}'$ at a predetermined cycle. By this configuration, in the steering angle midpoint output section 252, if the value Flg4 is set to "1", an average steering angle midpoint estimation signal $\theta_{C,E}{}'$ that is currently fetched and stored is output from the signal storage 252a, and if the value Flg4 is set to "0", an average steering angle midpoint estimation signal $\theta_{C,E}{}'$ before one cycle, that is, a steering angle midpoint estimation signal $\theta_{C,E}{}'$ immediately before occurrence of abnormality is output from the signal storage. The output result is input to the subtracter 254b, and the subtracter 254b subtracts the relative steering angle $\theta_M{}'$ from the output of the steering angle midpoint output section 252, and thereby outputs the steering angle estimation signal $\theta_{E,3}$.

The steering angle estimation signal $\theta_{E,3}$ is input to the multiplier 253b, and multiplied by the value Flg5, and the result is input to the adder 255. On the other hand, in the multiplier 253a, the steering angle estimation signal $\theta_{E,2}$ detected by the steering angle estimation signal calculating part 151 is multiplied by the value Flg4, and the result is input to the adder 255.

In the adder 255, the output result of the multiplier 253a and the output result of the multiplier 253b are added together to obtain a signal S", and the signal S" is then output to the steering wheel return controlling part 40.

By this configuration, if normality is determined by the sensor abnormality detector 250, the steering angle estimation signal $\theta_{E,2}$ calculated by the steering angle estimation signal calculating part 151 is output to the steering wheel return controlling part 40. On the other hand, if abnormality is determined by the sensor abnormality detector, an average steering angle midpoint estimation signal $\theta_{C,E}{}'$ is calculated from "N" steering angle midpoint estimation signals $\theta_{C,E}$ that are stored until immediately before occurrence of abnormality, and the steering angle estimation signal $\theta_{E,3}$ is calculated from the average steering angle midpoint estimation signal $\theta_{C,E}{}'$ and the relative steering angle signal $\theta_M{}'$ and then output to the steering wheel return controlling part.

Accordingly, according to the present embodiment, the same operational effects as those of the third embodiment are exhibited, and particularly, the signal S" is calculated from the average value of a plurality of steering angle midpoint estimation values. Thus, a precise steering angle estimation signal can be calculated and output to the steering wheel return controlling part when abnormality has occurred, and a steering feeling loss can be further suppressed. Also, the stability of an electric power steering control device can be maintained.

Although description of concrete embodiments 1 to 4 is finished herewith, aspects of the invention are not limited to these embodiments, and variations, improvements, etc. can be made appropriately. For example, although most of processing in the present embodiments is performed by software, some or all of the processing may be realized by hardware, such as FPGA (Field Programmable Gate Array). Further, although the steering torque signal T, the relative steering angle signal $\theta_M{}'$, and vehicle speed signal V are illustrated and described as signals for estimating the steering angle, the invention is not limited thereto, and wheel speed, etc., may be used.

Moreover, although the present embodiment has been described by illustration of the steering wheel return controlling part, the invention is not particularly limited thereto, and can be applied to various control units and compensators that fetch and process a steering angle signal.

In addition, the invention can be applied to all electric power steering apparatuses, irrespective of the type (a column, type, a pinion type, a rack type) of electric power steering apparatuses, and the kind of motors (a brush motor, a brushless motor, etc.).

Fifth Embodiment

Figure 9:
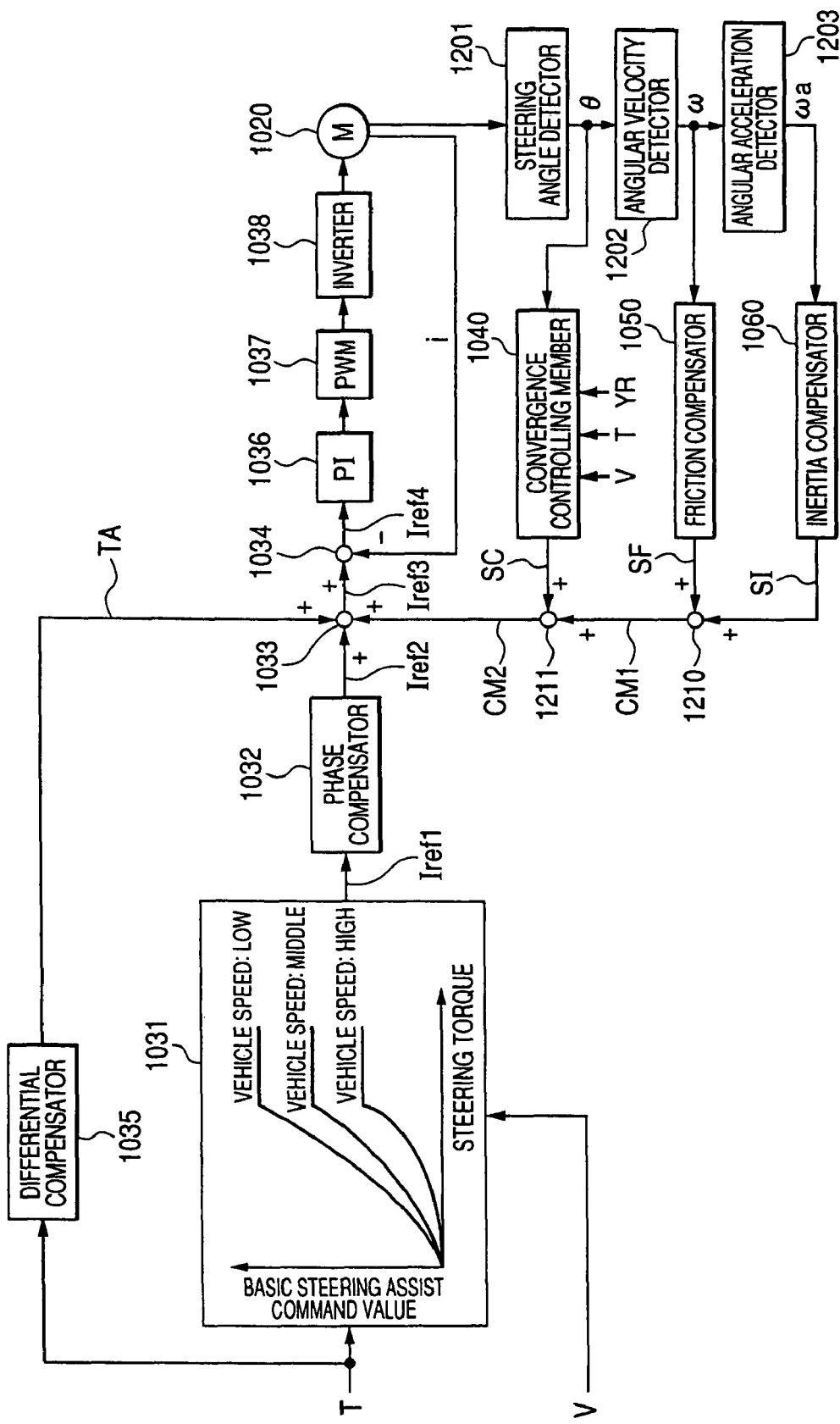
FIG. 9 is a block diagram showing an exemplary configuration of a control device according to an embodiment the invention.
Figure 14:
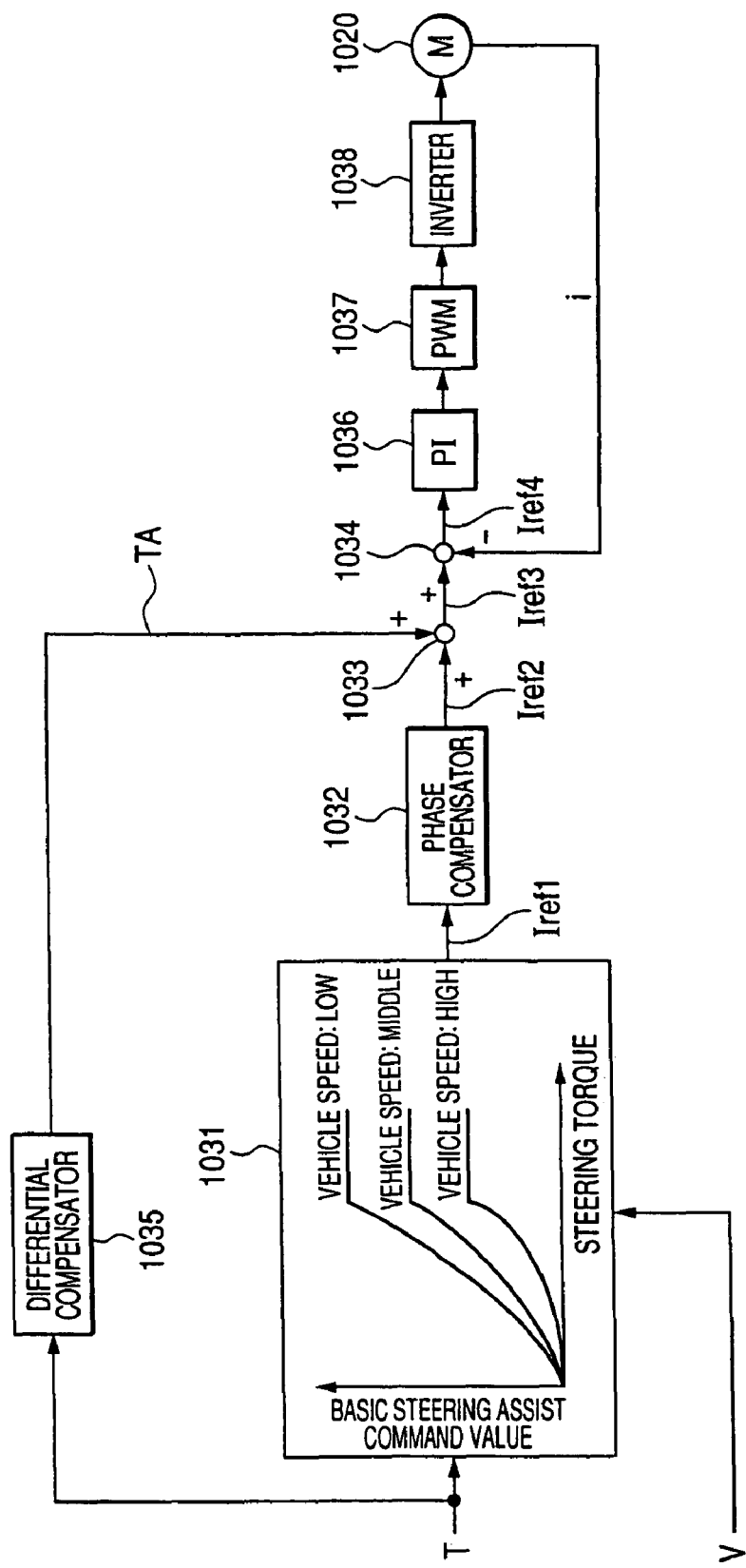
FIG. 14 is a block diagram showing an exemplary configuration of a control unit.

FIG. 9 shows an exemplary configuration of a control device according to the invention in such a manner that it corresponds to FIG. 14. With reference to this figure, a steering torque T is input to a steering assist command value calculating part 1031 and a differential compensator 1035, and the steering torque is also input a convergence controlling part 1040. A steering angle detector 1201, such as a resolver or a Hall sensor, is attached to a motor 1020, a convergence steering angle θ is input to the convergence controlling part 1040 and an angular velocity detector 1202, and an angular velocity ω detected by the angular velocity detector 1202 is input to a friction compensator 1050 and an angular acceleration detector 1203. An angular acceleration ω a detected by the angular acceleration detector 1203 is input to an inertia compensator 1060.

The convergence controlling part 1040 is a controlling part that applies the brake to the swinging movement of a steering wheel in order to improve the convergence of yawing of a vehicle, and a steering angle θ, a steering torque T, a vehicle speed V, and a yaw rate signal YR are input to the convergence controlling part 1040. The friction compensator 1050 compensates friction within a mechanism of a steering system, and friction between a tire and a road surface, and the inertia compensator 1060 assists in exerting a force equivalent to the force generated according to the inertia of the motor 1020, and prevents degradation of a feeling of inertia or degradation of responsiveness of control. An inertia compensation value SI from the inertia compensator 1060 and a friction compensation value SF from the friction compensator 1050 are added together by an adder 1210. A compensatory signal CM1 (=SI+SF) that is the result of addition is added to a convergence control value SC from the convergence controlling part 1040 by an adder 1211. A compensatory signal CM2(=CM1+SC=SI+SF+SC) that is the result of addition is added to a current command value Iref2 and a steering torque TA by an adder 1033, and is corrected by the adder. In addition, the yaw rate signal YR is obtained from actual measurement in a yaw rate measurement section or from estimation in a yaw rate estimation section.

Figure 10:
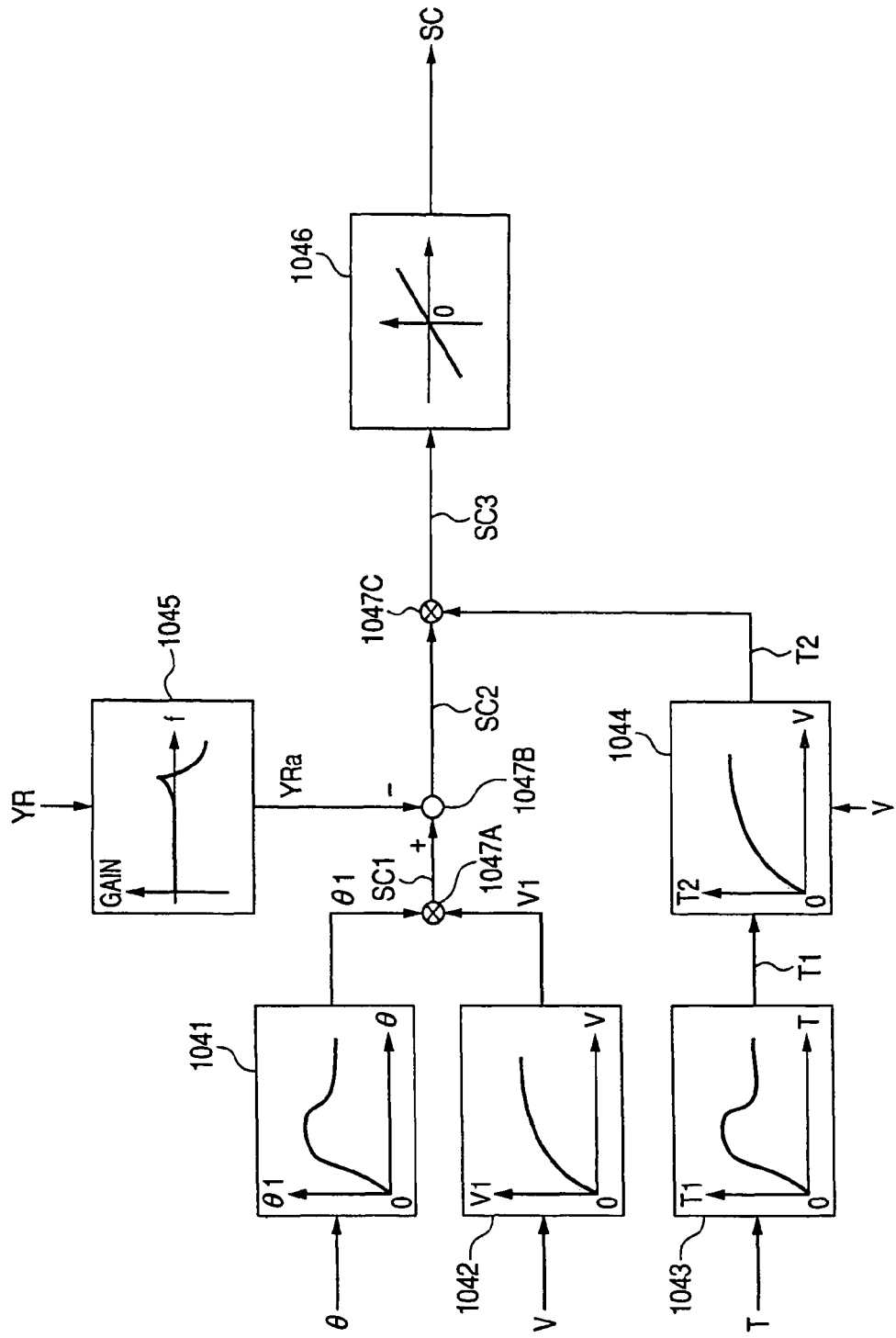
FIG. 10 is a block diagram showing an exemplary configuration of a convergence controlling part.

FIG. 10 shows an exemplary configuration of the convergence controlling part 1040. Referring to this figure, the steering angle θ is converted into a target steering angle θ1 by a conversion table 1041, the vehicle speed V is converted into a target vehicle speed V1 by a vehicle speed conversion table 1042, the target steering angle θ1 and the target vehicle speed V1 are multiplied together by a multiplier 1047A, and the multiplication result SCI is supplied as an addition input to the subtracter 1047B. The yaw rate signal YR is input to a yaw rate signal processor 1045, a yaw rate signal YRa that has been processed in a frequency domain is supplied as a subtraction input to the subtracter 1047B, and the subtraction result SC2(=SCI−YRa) is input to a multiplier 1047C. Further, the steering torque T is input to and gain-converted in a torque conversion table 1043, a steering torque T1 that has been gain-converted is converted into a steering torque T2 corresponding to the vehicle speed V by the vehicle speed response table 1044, and the steering torque T2 is input to the multiplier 1047C. The multiplication result SC3 of the multiplier 1047C is gain-adjusted by a gain table 1046, and is output as a convergence control value SC.

The convergence controlling part 1040 controls an assist amount so as to obtain a yaw rate suitable for the current vehicle speed and steering angle. That is, the convergence controlling part calculates a convergence control value so that the deviation between a target yaw rate and an actual yaw rate may become 0, and adds the convergence control value to a current command value. During low speed, a return speed can be surely returned to neutrality of the steering angle θ at an arbitrary speed. Also, when a steering wheel is released during high-speed driving, the convergence speed of a vehicle is suppressed moderately, and thereby the convergence of a safe yaw rate is realized.

The steering angle conversion table 1041 is a table that defines the target of a yaw rate to a steering angle θ, and the value, obtained by multiplying a gain to the deviation between an actual yaw rate (yaw rate signal YRa) and the target of a yaw late, becomes a control output. If a yaw rate is larger than a target value, this functions as damping, and conversely if a yaw rate is smaller than a target rate, this functions in a direction in which the yaw rate is accelerated, i.e., in a direction in which steering is easily performed. The characteristics of the steering angle conversion table 1041, as shown in FIG. 10, become such characteristics that the target steering angle rises correspondingly to a steering angle θ in a region where the steering angle θ is small, the target steering angle gradually falls in a middle steering angle, and the target steering angle becomes substantially constant when the steering angle is below a predetermined value.

Further, the vehicle speed conversion table 1042 is a vehicle speed response table to a target, and it is desirable that a gain is set low as the vehicle speed V rises. This is because, as the vehicle speed increases, the return of a steering wheel improves and the convergence of the yaw rate of a vehicle improves. In contrast, a vehicle in which friction of a steering system is large and a steering wheel is not sufficiently returned, as shown in FIG. 10, has characteristics that the target vehicle speed gain increases gradually corresponding to an increase in vehicle speed V.

The torque conversion table 1043 is a table that limits output according to a steering torque T. Since damping control is an objective, output is limited when the steering torque T is large (when a driver steers in positively, etc.), and steering becomes easier. Therefore, the characteristics of the torque conversion table 1043, as shown in FIG. 10, become such characteristics that the target steering torque rises correspondingly to a steering torque T in a region where the steering torque T is small, the target steering torque gradually falls in a middle steering torque, and the target steering torque becomes substantially constant when the steering torque is below a predetermined value.

Furthermore, the vehicle speed response table 1044 is used to increase a gain because the output of the convergence controlling part 1040 is decreased while the deviation of the yaw rate is small when damping is positively required at high vehicle speed. The characteristics of the table, as shown in FIG. 10, become such characteristics that the target torque increases gradually corresponding to an increase in vehicle speed V. The yaw rate signal processor 1045 has characteristics that the gain first increases in a high-frequency region, and then decreases at a frequency beyond the region.

The vehicle speed V input to the steering assist command value calculating part 1031, etc. is obtained from a vehicle speed sensor or a CAN (Controller Area Network), and the steering angle θ is obtained from a steering angle sensor attached to a motor, or from steering angle estimation. Further, although FIG. 9 shows that the motor angular velocity ω is detected by the motor angular velocity detector 1202, the motor angular velocity may be obtained from the back-electromotive force of a motor 1020.

Figure 11:
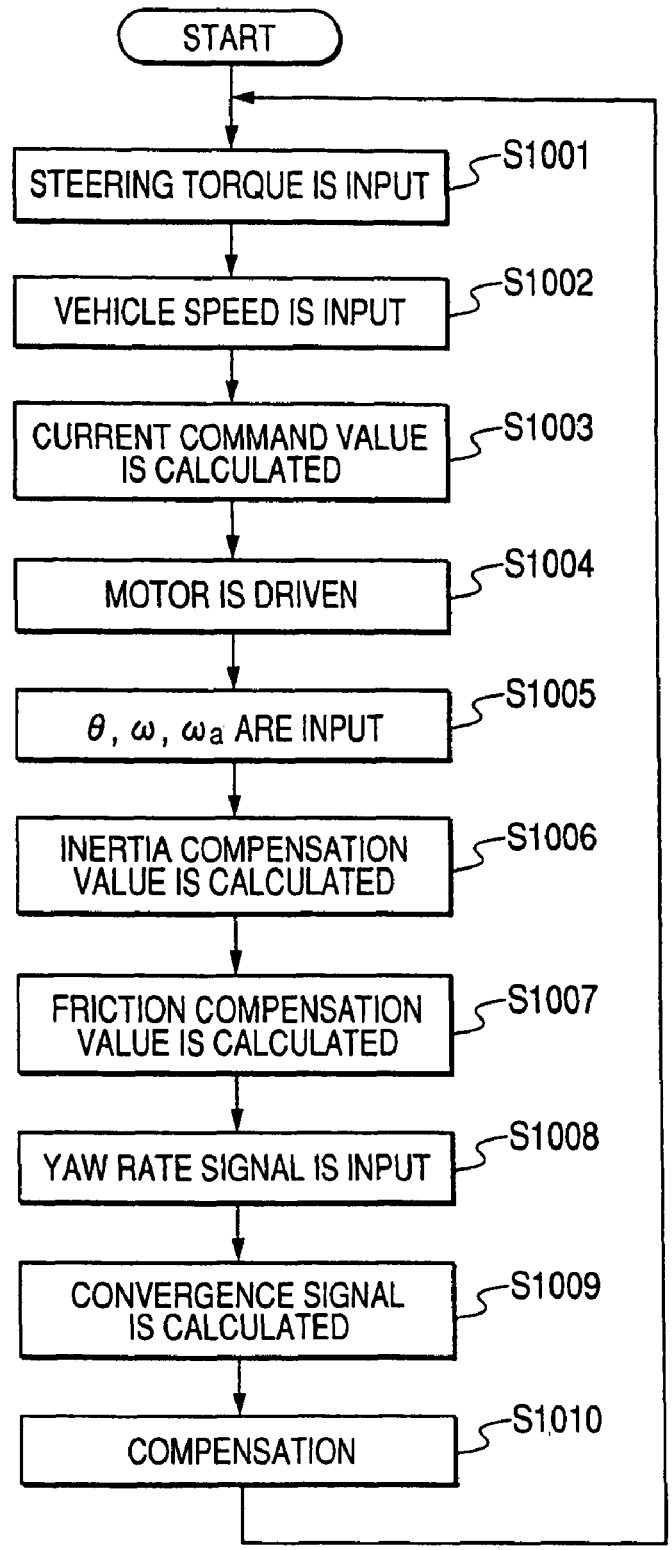
FIG. 11 is a flow chart showing an example of the overall operation of the invention.

In such a configuration, the operation will be described with reference to the flow chart of FIGS. 11 and 12.

First, a steering torque T is input (Step S1001 from a torque sensor, a vehicle speed V is then input from a vehicle speed sensor (Step S1002), a current command value is calculated by the steering assist current command value calculating part 1031, etc. (Step S1003), and the motor 1020 is driven by the inverter 1038 (Step S1004). In addition, the steering torque T and the vehicle speed V are input in an arbitrary order. The steering angle θ detected by the steering angle detector 1201, the angular velocity ω detected by the angular velocity detector 1202, and the angular acceleration ω a detected by the angular acceleration detector 1203 are input (Step S1005), the inertia compensator 1060 calculates the inertia compensation value SI (Step S1006), and the friction compensator 1050 calculates the friction compensation value SF (Step S1007). Then, the yaw rate YR is input (Step S1008), the convergence controlling part 1040 calculates the convergence control value SC on the basis of the vehicle speed V, the steering torque T, the steering angle θ, and the yaw rate YR (Step S1009), and the compensatory signal CM2 is calculated on the basis of the inertia compensation value SI, the friction compensation value SF, and the convergence control value SC, and then the current command value Iref2 is corrected and compensated by the adder 1033 (Step S1010).

Figure 12:
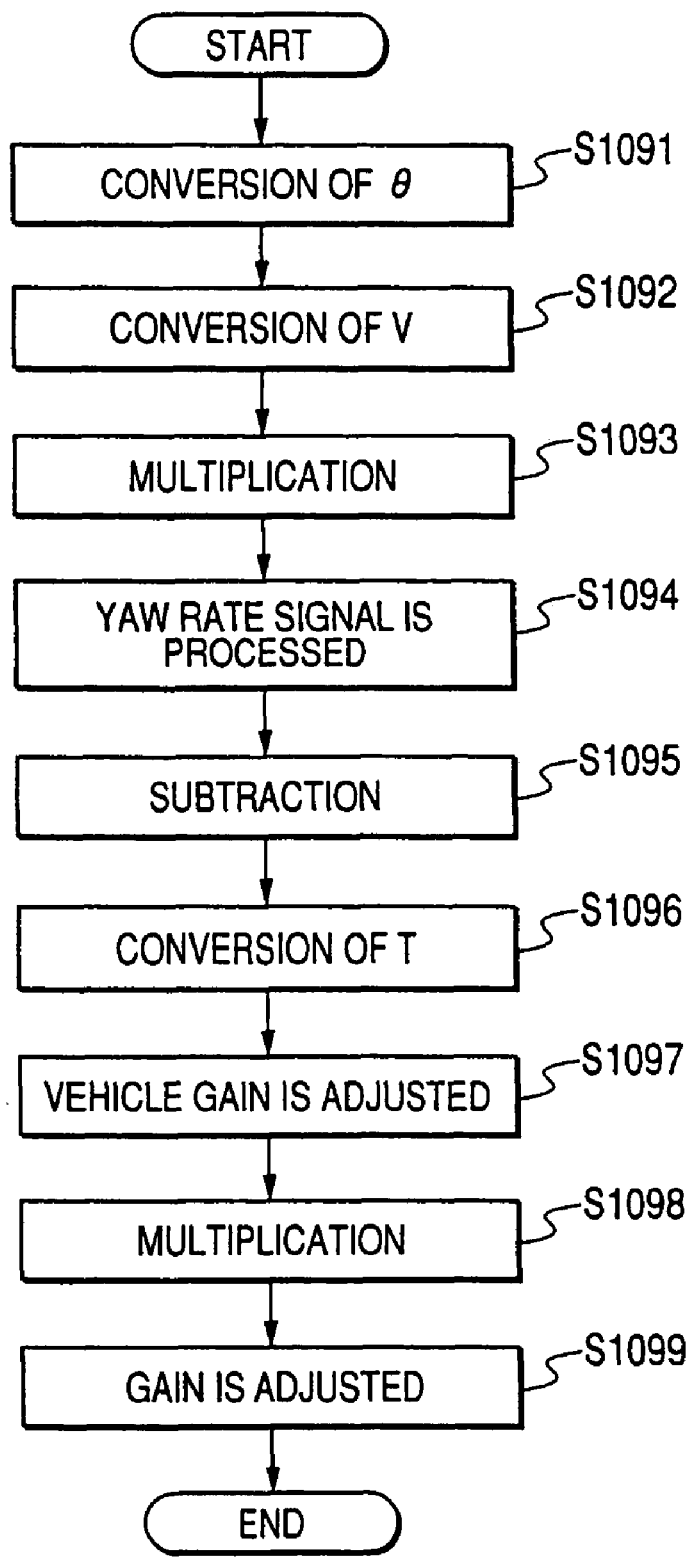
FIG. 12 is a flowchart showing an exemplary operation of the convergence controlling part.
Figure 13:
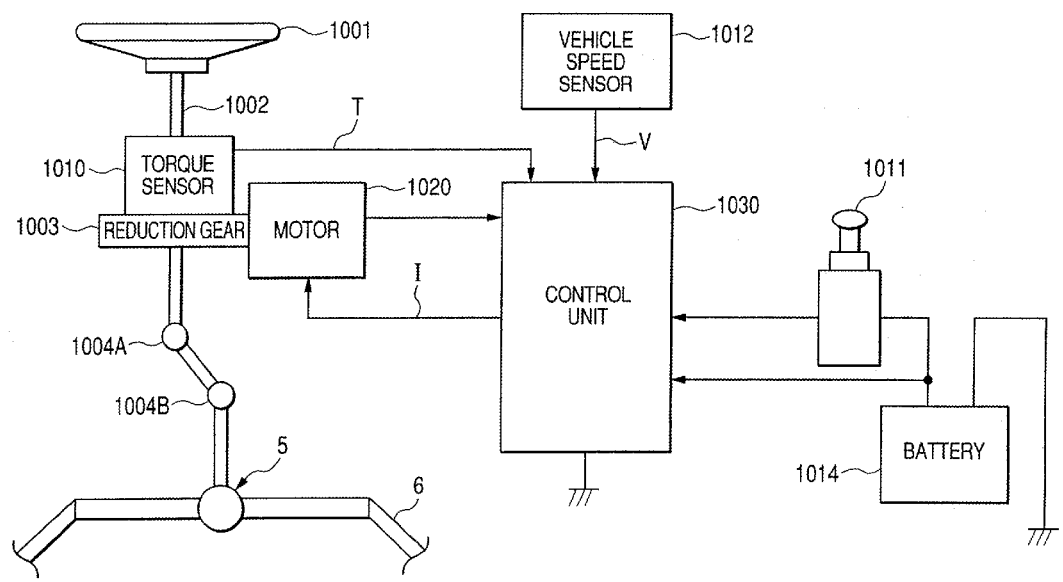
FIG. 13 is a view showing a general exemplary configuration of an electric power steering apparatus.

The calculation (Step S1009) of the convergence control value SC is executed as shown in FIG. 12. That is, conversion of the steering angle θ into the target steering angle θ1 is first performed by the steering angle conversion table 1041 (Step S1091), conversion of the vehicle speed V into the target vehicle speed V1 is performed by the vehicle speed conversion table 1042 (Step S1092), and multiplication of the target steering angle θ1 and the target vehicle speed V1 is performed by the multiplier 1047A (Step S1093). The conversion of the steering angle θ and the conversion of the vehicle speed V are performed in an arbitrary order. The yaw rate signal YR is processed in a frequency domain by the yaw rate signal processor 1045 (Step S1094), the processed yaw rate signal YRa is subtracted from the subtraction result SCI of the subtracter 1047A (Step S1095), and the subtraction result SC2 is input to the multiplier 1047C.

Meanwhile, the steering torque T is converted into the torque T1 by the torque conversion table 1043 (Step S1096), and is then gain adjusted according to the vehicle speed V by the vehicle speed response table 1044 (Step S1097). The gain-adjusted steering torque T2 is multiplied by SC2 by the multiplier 1047C (Step S1098), and the multiplication result SC3 is gain-adjusted by the gain table 1046 (Step S1099), and is output as the convergence control value SC.

Although the above-mentioned fifth embodiment gives the friction compensation and the inertia compensation as examples of compensation, motor loss torque compensation that performs an assist equivalent to a loss torque in the rotational direction of a motor, robust stabilizing compensation for enhancing the responsiveness of control in the vicinity of neutrality of steering, and for performing smooth steering, and the like may be performed additionally. Further, the steering angle conversion table 1041, the vehicle speed conversion table 1042, the torque conversion table 1043, the vehicle speed response table 1044, the yaw rate signal processor 1045, and the gain table 1046 may store a plurality of characteristics tables so that they may be switched for use.

While the present invention has been described in detail and with reference to specific embodiments thereof, it will be apparent to one skilled in the art that various changes and modifications can be made therein without departing from the spirit and scope thereof.

What is claimed is:

1. An electric power steering apparatus comprising:
   a steering angle detection part that detects a steering angle of a steering wheel and outputs a steering angle signal based on the detected steering angle;
   a steering control unit that controls a motor to give an assist torque to the steering wheel based on the steering angle signal;
   an abnormality detection part that determines an abnormality of the steering angle detection part based on the steering angle signal; and
   a motor angle detection part that detects a rotational angle of the motor and outputs a motor angle signal based on the detected rotational angle,
   wherein the steering control unit calculates a steering angle information based on at least the steering angle signal,
   the steering control unit includes a signal storage part that stores the calculated steering angle information, and
   the steering control unit is configured to control the motor and run the motor continuously when the abnormality detection part detects an occurrence of the abnormality of the steering angle detection part until a vehicle stops or until the abnormality detection part determines that the steering angle signal returns to a normal state from the occurrence of the abnormality, based on a first steering angle information, among the stored steering angle information, stored in the signal storage part immediately before the occurrence of the abnormality and the motor angle signal output by the motor angle detection part.

2. The electric power steering apparatus according to claim 1, wherein the steering angle information is a steering angle midpoint signal calculated from the steering angle signal and the motor angle signal.

3. The electric power steering apparatus according to claim 1, wherein the steering control unit comprises a signal arithmetic processing part that calculates an average value of the steering angle information stored in the signal storage part in a predetermined period, and
   when the abnormality detection part detects the occurrence of the abnormality of the steering angle detection part, the steering control unit controls the motor and runs the motor continuously based the calculated average value of the steering angle information stored in the signal storage part.

* * * * *